US007633726B2

(12) United States Patent
Huang et al.

(10) Patent No.: US 7,633,726 B2
(45) Date of Patent: Dec. 15, 2009

(54) GROUND FAULT CIRCUIT INTERRUPTERS WITH MISWIRING OR REVERSE WIRING PROTECTION AND END OF LIFE ALARM SIGNAL

(76) Inventors: Huadao Huang, c/o Shanghai Meihao Electric Inc., No. 58, Shahe Road, Jiangqiao Town, Jiading Borough, Shanghai (CN) 201803; Huayang Lu, c/o Shanghai Meihao Electric Inc., No. 58, Shahe Road, Jiangqiao Town, Jiading Borough, Shanghai (CN) 201803

( * ) Notice: Subject to any disclaimer, the term of this patent is extended or adjusted under 35 U.S.C. 154(b) by 150 days.

(21) Appl. No.: 11/362,040

(22) Filed: Feb. 27, 2006

(65) Prior Publication Data

US 2006/0279886 A1 Dec. 14, 2006

Related U.S. Application Data

(60) Provisional application No. 60/656,090, filed on Feb. 25, 2005.

(51) Int. Cl.
*H02H 3/00* (2006.01)

(52) U.S. Cl. ........................................................ 361/42

(58) Field of Classification Search .................... 361/42
See application file for complete search history.

(56) References Cited

U.S. PATENT DOCUMENTS

| | | | | |
|---|---|---|---|---|
| 4,386,338 | A | | 5/1983 | Doyle et al. |
| 4,518,945 | A | | 5/1985 | Doyle et al. |
| 4,595,894 | A | | 6/1986 | Doyle et al. |
| 5,202,662 | A | | 4/1993 | Bienwald et al. |
| 5,654,857 | A | | 8/1997 | Gershen |
| 5,680,287 | A | | 10/1997 | Gernhard et al. |
| 5,847,913 | A | * | 12/1998 | Turner et al. ............... 361/93.1 |
| 5,963,408 | A | | 10/1999 | Neiger et al. |
| 6,040,967 | A | | 3/2000 | DiSalvo |
| 6,052,265 | A | | 4/2000 | Zaretsky et al. |
| 6,111,733 | A | | 8/2000 | Neiger et al. |
| 6,226,161 | B1 | | 5/2001 | Neiger et al. |
| 6,246,558 | B1 | | 6/2001 | DiSalvo et al. |
| 6,252,407 | B1 | | 6/2001 | Gershen |
| 6,282,070 | B1 | | 8/2001 | Ziegler et al. |
| 6,288,882 | B1 | | 9/2001 | DiSalvo et al. |
| 6,309,248 | B1 | | 10/2001 | King |
| 6,381,112 | B1 | | 4/2002 | DiSalvo |
| 6,437,953 | B2 | | 8/2002 | DiSalvo et al. |

(Continued)

*Primary Examiner*—Stephen W Jackson
*Assistant Examiner*—Ann T Hoang
(74) *Attorney, Agent, or Firm*—Fei-Fei Chao; Andrews Kurth LLP

(57) ABSTRACT

This invention provides protection against an electricity leak and prevents error in reverse wiring. Also, when the ground fault circuit interrupter has come to the end of its life and its functions fail, it can set off an alarm prompt signal, reminding the user to replace the interrupter in a prompt manner; when a certain part or accessory of the ground fault circuit interrupter fails, especially when the primary electromagnetic coil cannot work in a normal manner, the power output of the interrupter may be cut off through the secondary electromagnetic coil; or the test button may be pressed to mechanically cut off the power output of the interrupter. This invention has powerful applications, with good safe guard and is safe to use, thus effectively ensuring the personal safety of the user as well as the safety of the appliances.

16 Claims, 15 Drawing Sheets

U.S. PATENT DOCUMENTS 6,442,007 B1 * 8/2002 Li .............................. 361/42
6,469,881 B2 10/2002 Gershen et al.
6,580,344 B2 6/2003 Li
6,671,145 B2 12/2003 Germain et al.
6,864,766 B2 3/2005 DiSalvo et al.
6,963,260 B2 11/2005 Germain et al.
7,019,952 B2 3/2006 Huang et al.
7,049,910 B2 5/2006 Campolo et al.
7,049,911 B2 5/2006 Germain et al.
7,253,629 B1 * 8/2007 Richards et al. ............. 324/424
2004/0027740 A1 * 2/2004 Huang et al. .................. 361/42

* cited by examiner

GROUND FAULT CIRCUIT INTERRUPTERS WITH MISWIRING OR REVERSE WIRING PROTECTION AND END OF LIFE ALARM SIGNAL

RELATED APPLICATION

The present invention claims the priority of U.S. Provisional Application No. 60/656,090, filed on Feb. 25, 2005, which is herein incorporated by reference.

TECHNICAL FIELD

This invention is related to an electromagnetic ground fault circuit interrupter that can provide protection against any leaked electric current. In particular, it refers to an electromagnetic ground fault circuit interrupter with the feature of being capable of preventing wiring errors, providing alarm prompts and also providing forcible and mechanical release or disengagement.

BACKGROUND

With constant development of the ground fault circuit interrupter industry, people have an increasingly high demand for the usage safety of ground fault circuit interrupters, desiring that during the use of a ground fault circuit interrupter, when the interrupter comes to the end of its life and it has already lost its protective functions or its parts and accessories fail and do not work, the user can be reminded in a prompt manner to replace it with a new product. However, currently in the market, no ground fault circuit interrupter has been seen with the capacity to issue an alarm or prompt signal.

Also, electromagnetic ground fault circuit interrupters that have appeared on the market usually control whether the interrupters have any power output by controlling energization/de-energization of its internal electromagnetic coils. When a ground fault circuit interrupter has power output, once the electromagnetic coil fails and does not work normally, the user will not be able to cut off the power output of the ground fault circuit interrupter that has already failed.

Most of the electromagnetic ground fault circuit interrupters that have appeared on the market do not have the function of preventing wiring errors. During an installation, if the installer erroneously connects the output end of an interrupter as an input end to live and null power lines, the interrupter will not provide de-energization (tripping) protection against a leak electricity accident during power supply, and may mislead the user to continue to use the interrupter in an atmosphere of safe use; in case of a failure, it will be very difficult to avoid harm and thus not being able to provide protection.

SUMMARY OF THE INVENTION

In view of the above, the primary purpose of this invention is to provide a new type of more reliable electromagnetic ground fault circuit interrupter capable of preventing wiring errors, with a more rational design and structure.

Another purpose of this invention is to provide an electromagnetic ground fault circuit interrupter with dual electromagnetic coils. When the primary electromagnetic coil of the electromagnetic ground fault circuit interrupter fails, the power output of the interrupter may be cut off through another secondary electromagnetic coil.

Yet another purpose of this invention is to provide an electromagnetic ground fault circuit interrupter capable of issuing an alarm prompt signal when the electromagnetic ground fault circuit interrupter comes to the end of its life, i.e., when the internal parts and accessories participating in providing protection against any leaked electricity fail.

Yet another purpose of this invention is to provide an electromagnetic ground fault circuit interrupter capable of mechanical release. When a component in an electromagnetic ground fault circuit interrupter fails, the power output of the interrupter may be mechanically and forcibly cut off.

To achieve the aforementioned purposes, this invention uses the following technical solutions: an electromagnetic ground fault circuit interrupter that can prevent wiring errors, which comprises a housing and a circuit board installed inside the housing capable of achieving a ground fault circuit interrupter with/without power output.

On the aforementioned circuit board, the following are installed: a pair of flexible live power line and null power line input metal sheets, a differential transformer used to detect a leak electric current, a release apparatus that controls any contact between such flexible live power line and null power line input metal sheets and the interrupter output conductors and a primary electromagnetic coil that can cause such a release apparatus to act; and is characterized by the following: the interrupter power output conductors include a pair of power output metal sheets placed at the bottom and on the two sides of the housing and a pair of power output conductors placed on the two sides of the mid-level support of the housing; two fixed contacts are placed respectively on each metal power output conductor, and a pair of metal power output conductors have a total of two fixed contacts.

One end of the aforementioned flexible live power line and null power line input metal sheets threads through the differential transformer described, is connected to the wiring screw of live power line and null power line and welded to one end of the circuit board; on the other end, a pair of moving contacts are installed respectively, and this pair of moving contacts respectively correspond to the pair of fixed contacts on the power output conductors placed on the two sides of the mid-level support of the housing.

There are also two flexible metal sheets above and on the two sides of the circuit board described. One end of such flexible metal sheets, together with the aforementioned power output end that is placed in the base, are welded onto the other end of the circuit board. There is a pair of moving contacts on the other end of the flexible metal sheets. This pair of moving contacts respectively corresponds to another pair of fixed contacts on the power output conductors described, thus constituting four pairs of power switches in two groups.

The aforementioned release apparatus includes a release, a fastener part, a spring and a fastener lever.

The aforementioned release is a cylindrical body located below the reset button. Its left and right sides extend outward to form lifting arms; the flexible power input metal sheets and flexible metal sheets described are respectively located on the upper part of the lifting arms on both sides of the release, and the locations of the moving contacts on the power input metal sheets and flexible metal sheets cross each other above the upper part of the sides of the release; on top of the release, there is a longitudinally-extending, central perforation.

Below the release, a movable fastener part shaped as an inverted letter "L," made of a metal material, threads through the release. On top of the fastener part, there is also a perforation.

Between the side wall of the release and the side wall of the fastener part, there is a circular groove, in which there is a spring.

There is a hole at one end of the fastener part, and there is a release lever inside the hole. This release lever can resolve around a pivot point on the side wall of the release.

The release, fastener part, spring and release lever join each other and form a unit that can move freely. Between the bottom of the release described and the circuit board, there is a flexible unlocking switch made of a flexible metal material; one end of this unlocking switch is connected to the positive pole of the direct current output by the rectification circuit on the circuit board; the other end is fastened onto the circuit board and is connected to the silicon controlled control pole that controls whether the release coil is energized through the circuit board.

Below the release and the aforementioned differential transformer, a secondary electromagnetic coil with a built-in iron core is also installed. The end of the built-in iron core of the secondary electromagnetic coil directly faces the aforementioned release lever.

Two indicator lights are welded onto the circuit board described. One of them is a red indicator light, and the other is a green indicator light; a status indicator light hole is opened on the surface of the aforementioned housing; a light guide tube is placed above the red and green indicator lights to guide the output of light rays from the indicator lights. Such a light guide tube is built in the status indicator light hole.

The red indicator light is serially connected to a resistance and switches to form an alarm display circuit. The switches described are respectively located below the power input metal sheets and comes into power input metal sheets when the power input metal sheets are at their initial locations.

One end of the green indicator light is connected to the display signal output end of the control chip used to detect whether the electric components inside the ground fault circuit interrupter work normally and to control the action of various electric components. The other end of the green indicator light is connected to the positive pole of the diode rectification bridge on the circuit board through a resistance.

Below the test button, inside the housing described, on the lower part of the test metal sheet, there is a sliding sheet shaped as an inverted letter "L." The lower tip of the sliding sheet is pointed, and its lower tip threads through the mid-level support and comes into contact with the upper tip of the release lever described.

A spring is placed between the housing and the mid level support.

A protective shield is placed on the upper part of the coil mount of the primary electromagnetic coil described.

Two spacing shims are placed below the moving contact of the null power line and live power line input metal sheets, on the coil mount of the primary electromagnetic coil.

The inventive use of the above technical solutions not only provides this invention with protection against an electricity leak, but also enables it to prevent any error in reverse wiring. Also, when the ground fault circuit interrupter has come to the end of its life and its functions fail, it can set off an alarm prompt signal, reminding the user to replace the interrupter in a prompt manner; when a certain part or accessory of the ground fault circuit interrupter fails, especially when the primary electromagnetic coil cannot work in a normal manner, the power output of the interrupter may be cut off through the secondary electromagnetic coil; or the test button may be pressed to mechanically cut off the power output of the interrupter. This invention has powerful applications, with good safe guard and is safe to use, thus effectively ensuring the personal safety of the user as well as the safety of the appliances.

BRIEF DESCRIPTION OF THE DRAWINGS

FIG. 5-1B is a partial cross-sectional view along the C-C line in FIG. 3, where the interrupter is illustrated in a normal state with no power output.

FIG. 5-2A is a partial cross-sectional view along the A-A line in FIG. 3, where the interrupter is illustrated in a normal state with power output.

FIG. 5-2B is a partial cross-sectional view along the C-C line in FIG. 3, where the interrupter is illustrated in a normal state with power output.

FIG. 5-3A is a partial cross-sectional view along the A-A line in FIG. 3, when the test button is pressed so that the interrupter has no power output.

FIG. 5-3B is a partial cross-sectional view along the C-C line in FIG. 3, when the test button is pressed so that the interrupter has no power output.

FIG. 5-4 is a partial cross-sectional view along the C-C line in FIG. 3, when the power output is removed from the interrupter through the secondary electromagnetic coil.

FIG. 5-5 is a partial cross-sectional view along the C-C line in FIG. 3, and illustrates the interrupter being forcibly released through a mechanic means after the test button is pressed.

EMBODIMENTS AND DETAILED DESCRIPTION OF THE INVENTION

This invention discloses an enhanced, multifunctional electromagnetic ground fault circuit interrupter, for which functions for preventing wiring errors have been added by reference to Chinese patent applications number 00250313.1 and 0122689.4. When an installer erroneously connects the live power line and null power line inside a wall with the power output end of an interrupter and connects the power line of a home appliance with the input end of an interrupter, no matter how the reset button is pressed, there is no power output for this invention; this invention has also added a function to remind the user to replace the product in a prompt manner through lighting and sound alarms when the ground fault circuit interrupter fails and has come to the end of its life; this invention has also added a function whereby the user can cut off the power output of the interrupter through the secondary electromagnetic coil when a part or accessory inside the ground fault circuit interrupter, such as electromagnetic coil 26, fails; this invention has also added a function whereby the user can cut off the power output by forcible mechanical means, when a part or accessory inside the ground fault circuit interrupter, such as electromagnetic coil 26 and the secondary electromagnetic coil, fails.

Figure 1:
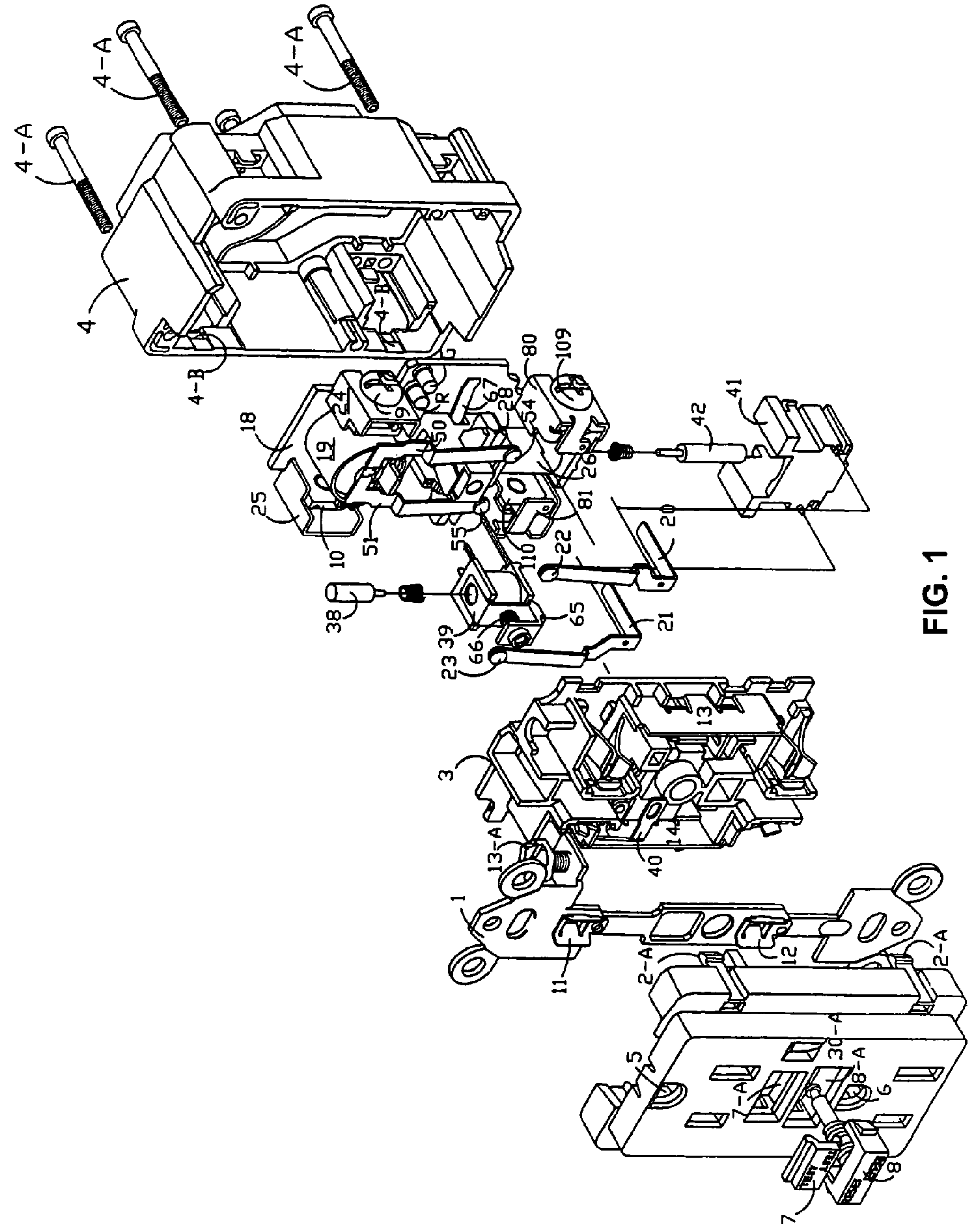
FIG. 1 is an exploded view illustrating the structure of an embodiment of this invention.

As shown in FIG. 1, the ground fault circuit interrupter disclosed by this invention primarily consists of a combination of a housing and a circuit board installed inside the housing capable of achieving an interrupter power output/disconnection and giving off a sound and light alarm prompt signal when the ground fault circuit interrupter has come to the end of its life.

The aforementioned housing consists of a combination of upper cover 2, mid-level support 3 and base 4; between upper cover 2 and mid-level support 3, there is metal grounding installation board 1; between mid-level support 3 and base 4, circuit board 18 is installed.

Figure 2:
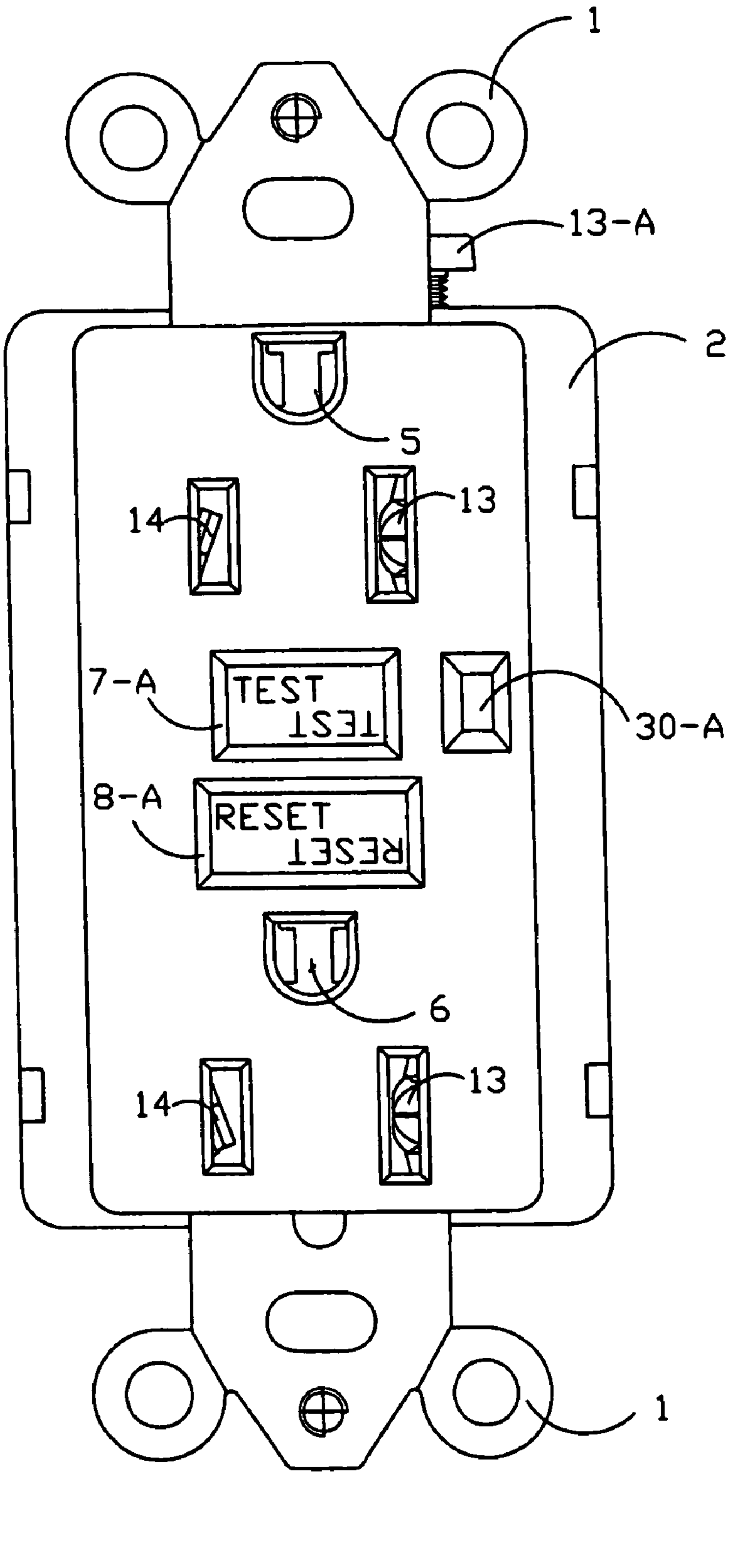
FIG. 2 is the front view of an embodiment of the present invention.
Figure 6:
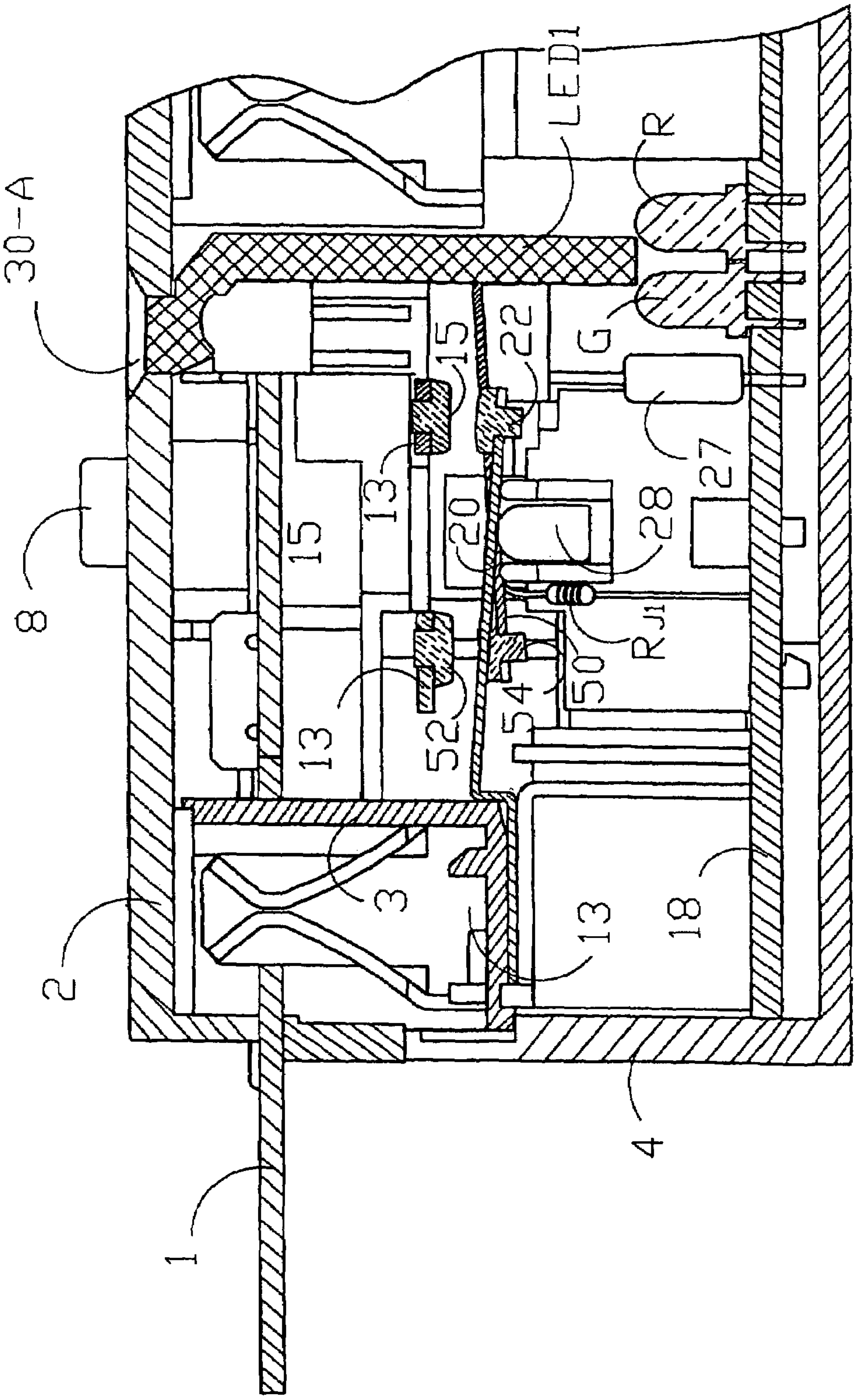
FIG. 6 is a partial cross-sectional view along the B-B line in FIG. 3, and is illustrates the location of the indicator light.

As shown in FIG. 1 and FIG. 2, power output plug holes 5 and 6, reset button hole 8-A, test button hole 7-A and status indicator hole 30-A are opened on upper cover 2. Reset button 8 and test button 7 are placed in reset button 8-A and test button hole 7-A. Reset button 8-A and test button hole 7-A thread through metal ground installation board 1 and mid-level support 3, and come into contact with the component assembly on circuit 18. As shown in FIG. 6, in status indicator light hole 30-A, light guide tube LED1 is embedded and is used to guide the light output of red and green indicator lights R and G. In addition, on the left and right sides of upper cover 2, there are four clamp hooks 2-A, to be used for fastening groove 4-B on base 4.

Metal grounding installation board 1 is connected to the earth through ground screw 13-A (as shown in FIG. 1 and FIG. 2) and cable. On metal ground installation board 1, at locations corresponding to the ground holes of power output plug holes 5 and 6 of upper cover 2, grounding vanes 11 and 12 are placed.

Figure 3:
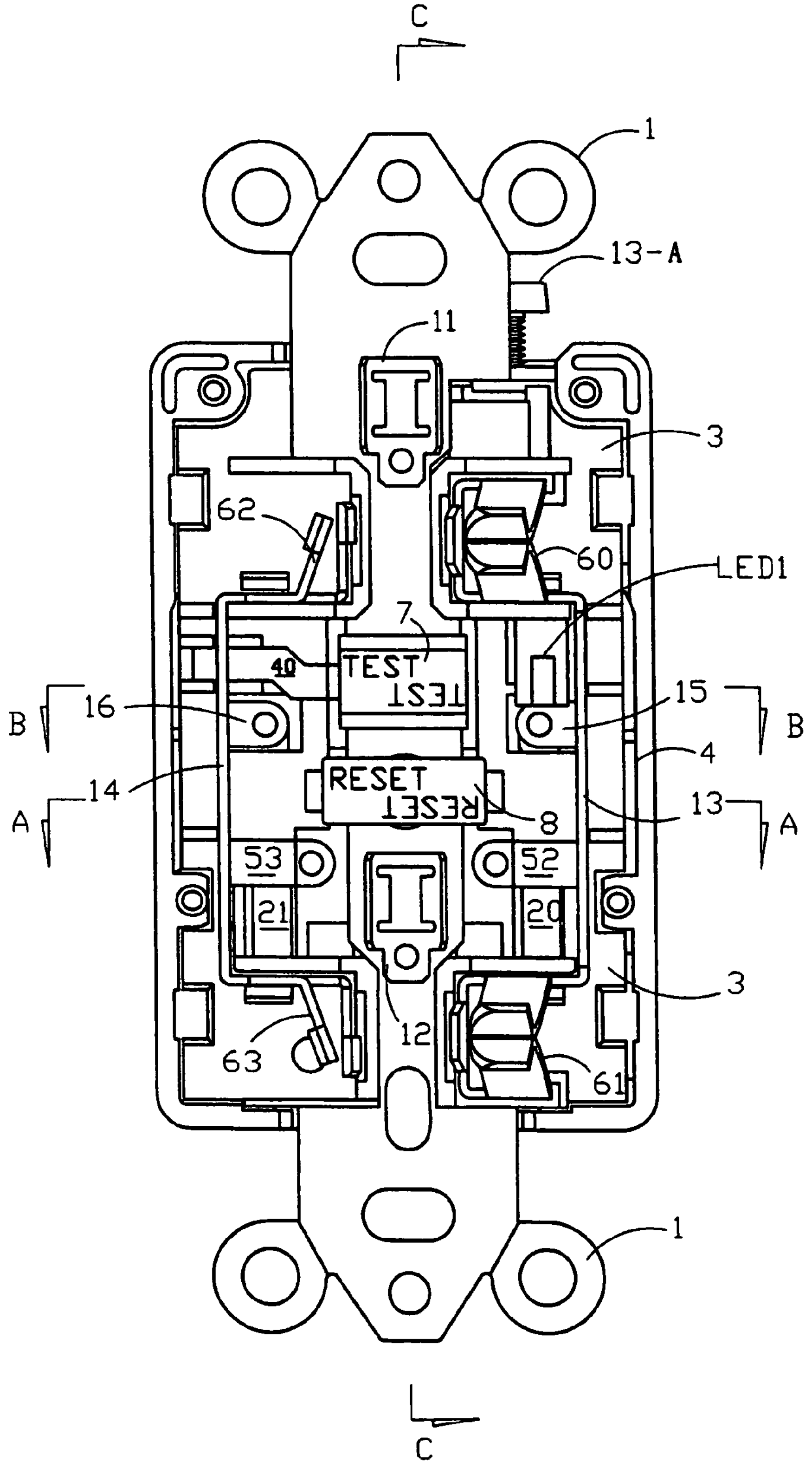
FIG. 3 is the front view of this invention with the upper cover removed.

As shown in FIG. 1 and FIG. 3, a live power line output conductor 14 and a null power line output conductor 13 are installed on both sides of mid-level support 3; on both sides of power output conductors 13 and 14, at locations corresponding to the null line holes and live line holes of power output plug holes 5 and 6 of upper cover 2, flaky clamp winglets 60, 61, 62 and 63 are placed. Fixed contacts 15, 52 and 16 and 53 are respectively placed on power output conductors 13 and 14, thus forming two pairs of fixed contacts: 15, 16 and 52 and 53.

As shown in FIG. 1, base 4 is used to accommodate mid-level support 4 and circuit board 18. On both sides of base 4, a pair of power input wiring screws 9 and 10 and a pair of power output wiring screws 109 and 110 are symmetrically placed. In base 4, a pair of null power line and live power line output ends 80 and 81 are placed and connected to power output wiring screws 109 and 110.

The core component assembly of this invention is circuit board 18 installed inside the housing, which is capable of energizing/or de-energizing power output wiring screws 109 and 110 on both sides of power output plug holes 5 and 6 and base 4 of upper cover 2 and automatic detection and handling of any electricity leak failure;

More importantly, when an installer erroneously connects the live power line and null power line inside a wall with the power output ends 110 and 109 of the interrupter and connects the power line of a home appliance with the input ends 10 and 9 of the interrupter, no matter how the reset button is pressed, there is no power output for this invention; when a part or accessory inside the ground fault circuit interrupter fails, an alarm prompt signal can be given off, and after the primary electromagnetic coil on the circuit board fails, there is a function whereby the power output of the interrupter can be cut off through the secondary electromagnetic coil and by forcible mechanical means.

Figure 4:
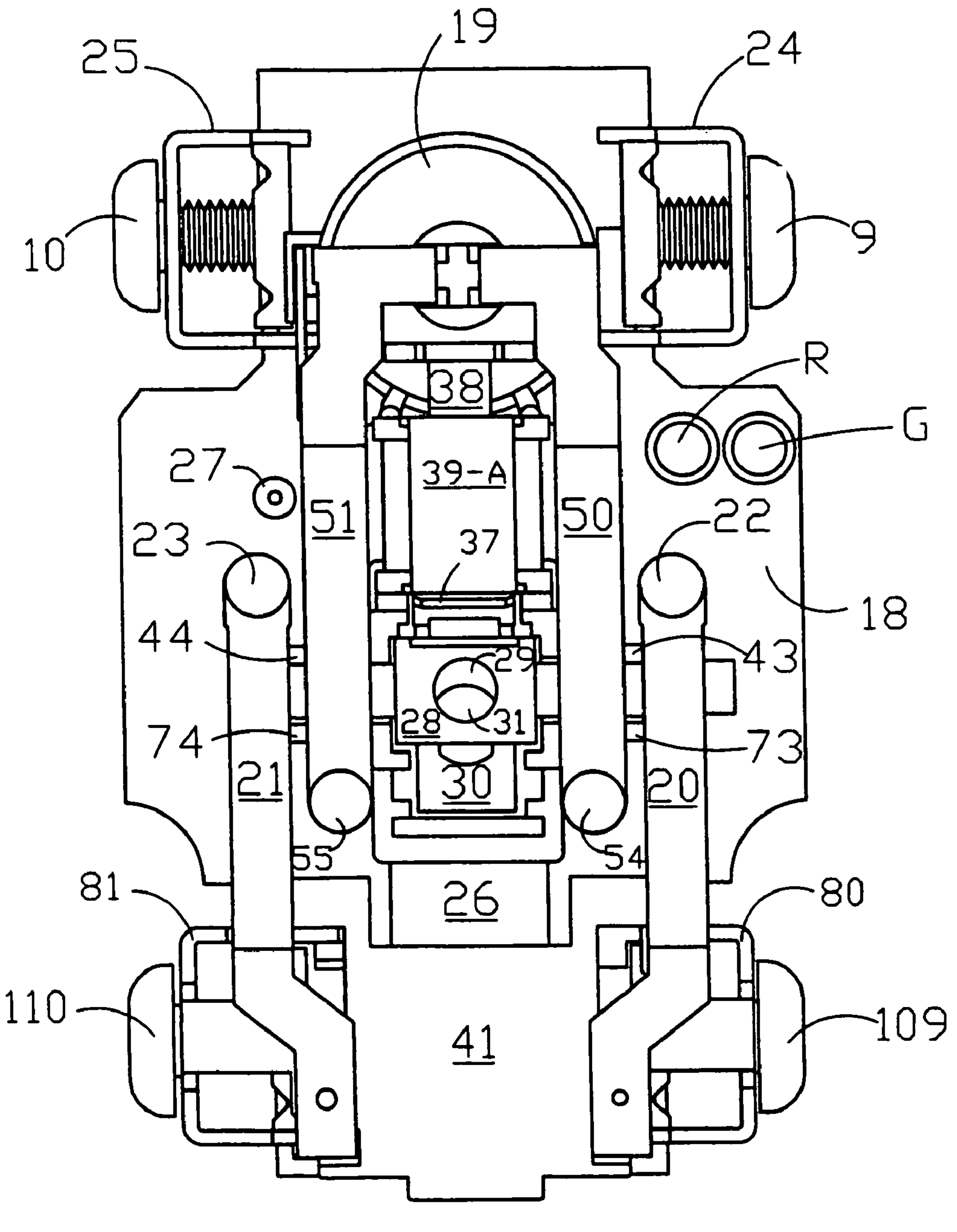
FIG. 4 is an illustration of the relationships among the parts on the circuit board according to this invention.

As shown in FIG. 1 and FIG. 4, two flexible power input metal sheets 50 and 51 are placed on this circuit board 18. One end of flexible power input metal sheets 50 and 51 is bent 90 degrees downward. It threads through differential transformer 19 and is welded onto circuit board 18, and is connected to null power line and live power line input screws 9 and 10 through input terminal lugs 24 and 25; moving contacts 54 and 55 is placed respectively on the other end of flexible power input metal sheets 50 and 51. Moving contacts 54 and 55 respectively correspond to fixed contacts 52 and 53 on power output conductors 13 and 14 placed on mid-level support 3 (as shown in FIG. 3). Two flexible metal sheets 20 and 21 are placed above and on the sides of circuit 18; one end of flexible metal sheets 20 and 21 are welded onto the circuit board, together with null power line and live line output ends 80 and 81, and are connected to power output wiring screws 109 and 110 placed on both sides of base 4; moving contacts 22 and 23 are placed on the other end. These moving contacts 22 and 23 respectively correspond to fixed contacts 15 and 16 on power output conductors 13 and 14 (as shown in FIG. 3). The aforementioned power input metal sheets 50 and 51, power output conductors 13 and 14 and the moving contacts and fixed contacts on flexible metal sheets 20 and 21 together constitute two groups and four pairs of power switches 54 and 52, and 53, 22 and 15, as well as 23 and 16.

Figure 8:
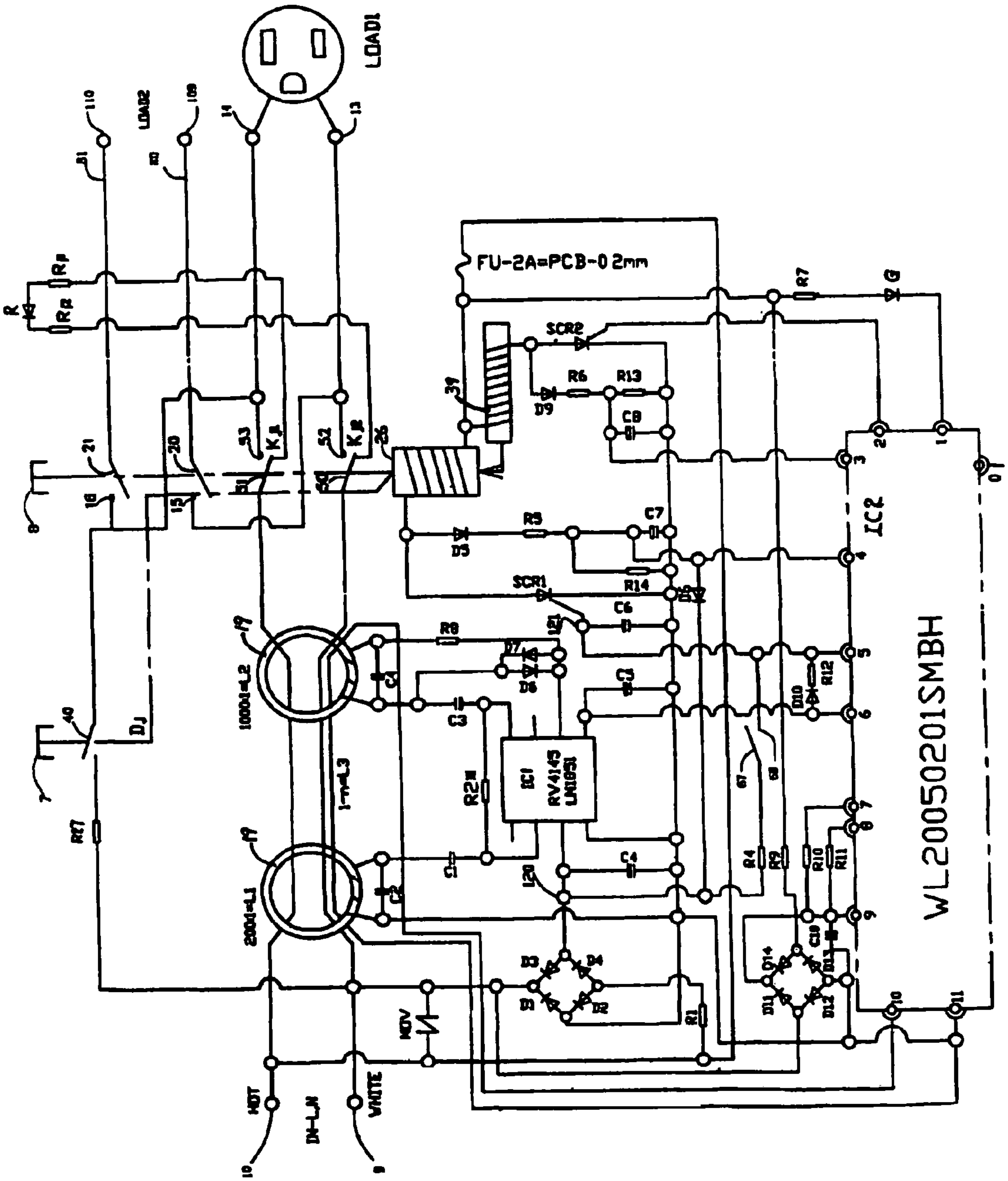
FIG. 8 illustrates a schematic view of a specific circuit diagram for the control circuit board of this invention.

A differential transformer 19 used for detecting any leak electric current is also placed on circuit board 18. As shown in FIG. 8, live power line HOT and null power line WHITE thread through differential transformer 18.

Figure 7:
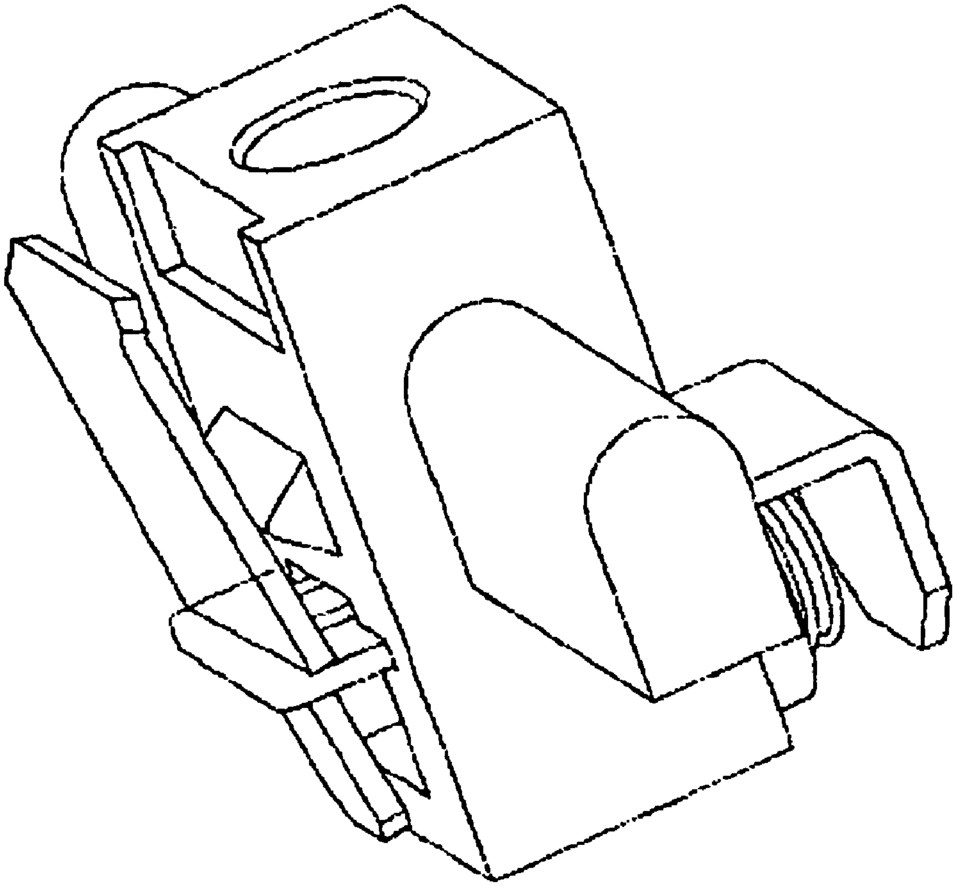
FIG. 7 is an outside view of the release apparatus of this invention.

A release apparatus is also placed on circuit board 18, which may enable flexible power input metal sheets 50 and 51 and power output conductors 13 and 14 to be energized and connected/or disconnected, and which may enable flexible metal sheets 20 and 21 to be energized/or de-energized through power output conductors 13 and 14, thus enabling power output ends 80 and 81 to be energized and connected/or disconnected. As shown in FIG. 7, such a release apparatus includes release 28, fastener part 30, fastener spring 34 and release lever 37, which are connected to each other and form a whole.

As shown in FIG. 1, FIG. 4, FIG. 5-1A, and FIG. 5-1B, release 28 in the release apparatus is a rectangular columnar body, located below reset button 8. Its left and right sides extend outward to form lifting arms. Flexible power input metal sheets 50 and 51 and flexible metal sheets 20 and 21 described are located on the upper part of the lifting arms on both sides of release 28 and can move up and down with release 28. In addition, as shown in FIG. 4, the locations of moving contacts 54 on input metal sheets 50 of the null power lines and the locations of moving contacts 22 on flexible metal sheets 20 on the upper part of the sides of release 28 cross each other. Similarly, the locations of moving contacts on input metal sheets 51 of the live power lines and the locations of moving contacts 23 on flexible metal sheet 21 on the upper part of the sides of release 28 also cross each other.

On top of release 28, there is a vertical, central perforation 29. reset guide column 35, which is embedded into at the bottom of reset button 8 and in which reset spring 91 is a slid, can move up and down along central perforation 29. In the lower part of reset guide column 35 and near its bottom, a circle of concave lock groove 36 is opened. In the lower part of release 28, a movable fastener part 30 shaped like an inverted letter "L" made of metal materials, threads through release 28. On top of fastener part 30, there is a perforation 31. Between the side wall of release 28 and the inside of fastener part 30, there is a circular groove 33, in which there is a fastener spring 34. Hole 32 is placed at one end of fastener part 30. Inside hole 32, there is a release lever 37. This release lever 37 can revolve on pivot point 28-A on the side wall of release 28.

On the outside of the side wall of fastener part 30, there is a primary electromagnetic coil 26, with a built-in movable iron core 42. The built-in iron core of primary electromagnetic coil 26 directly faces the side wall of fastener part 30. Above primary electromagnetic coil 26, there is a protective shield 41.

Figures 1A, 5:
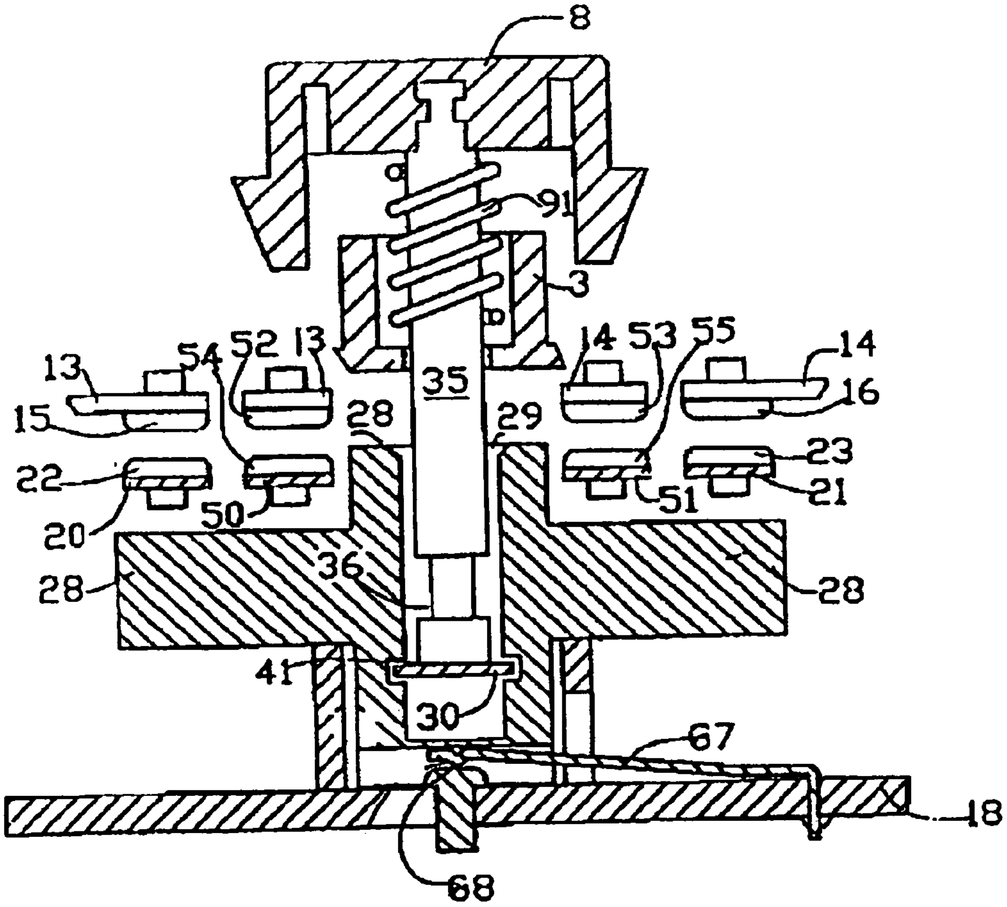
FIG. 5-1A is a partial cross-sectional view along the A-A line in FIG. 3, where the interrupter is illustrated in a normal state with no power output.
Figures 1B, 5:
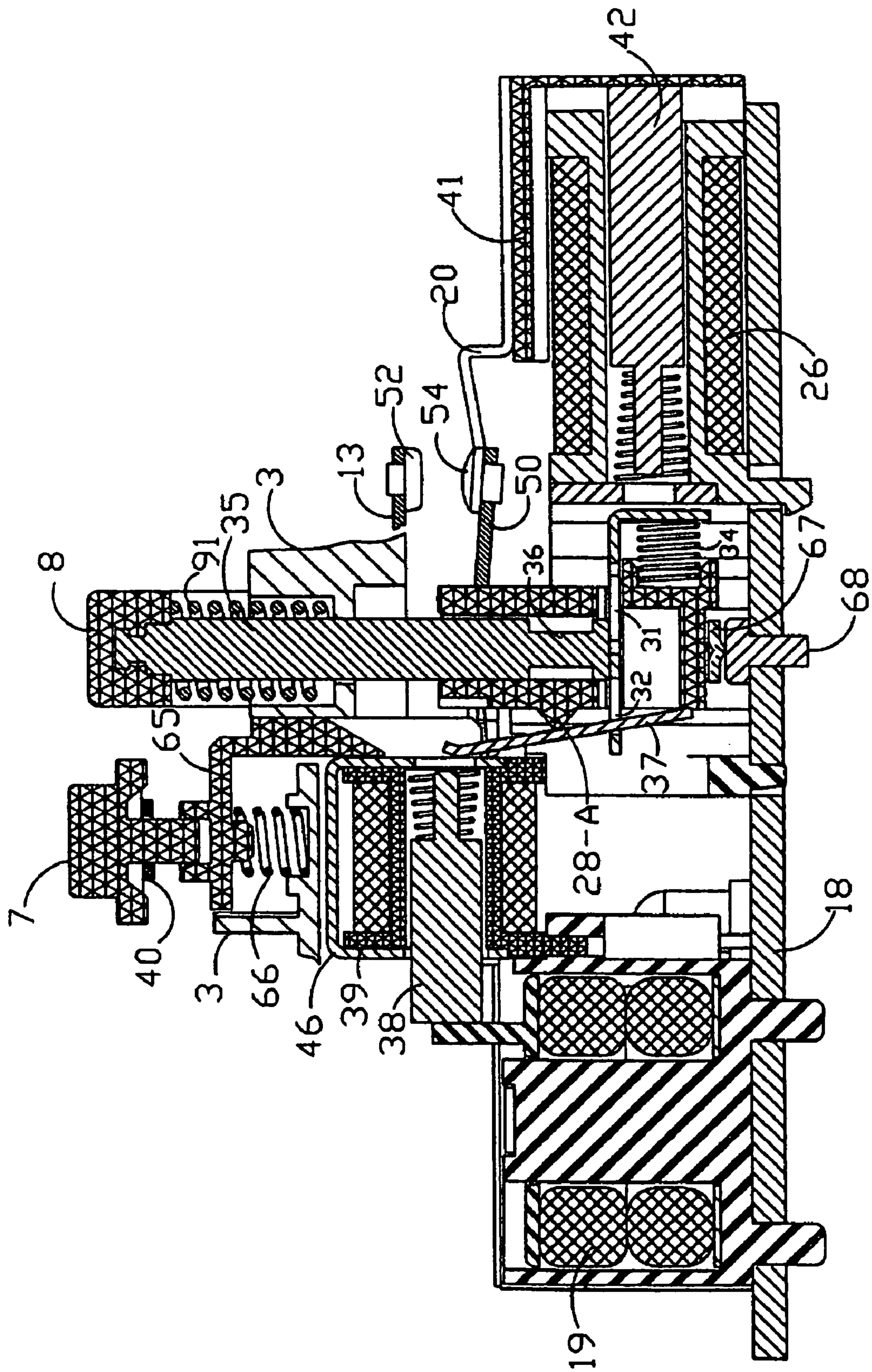
Figures 2A, 5:
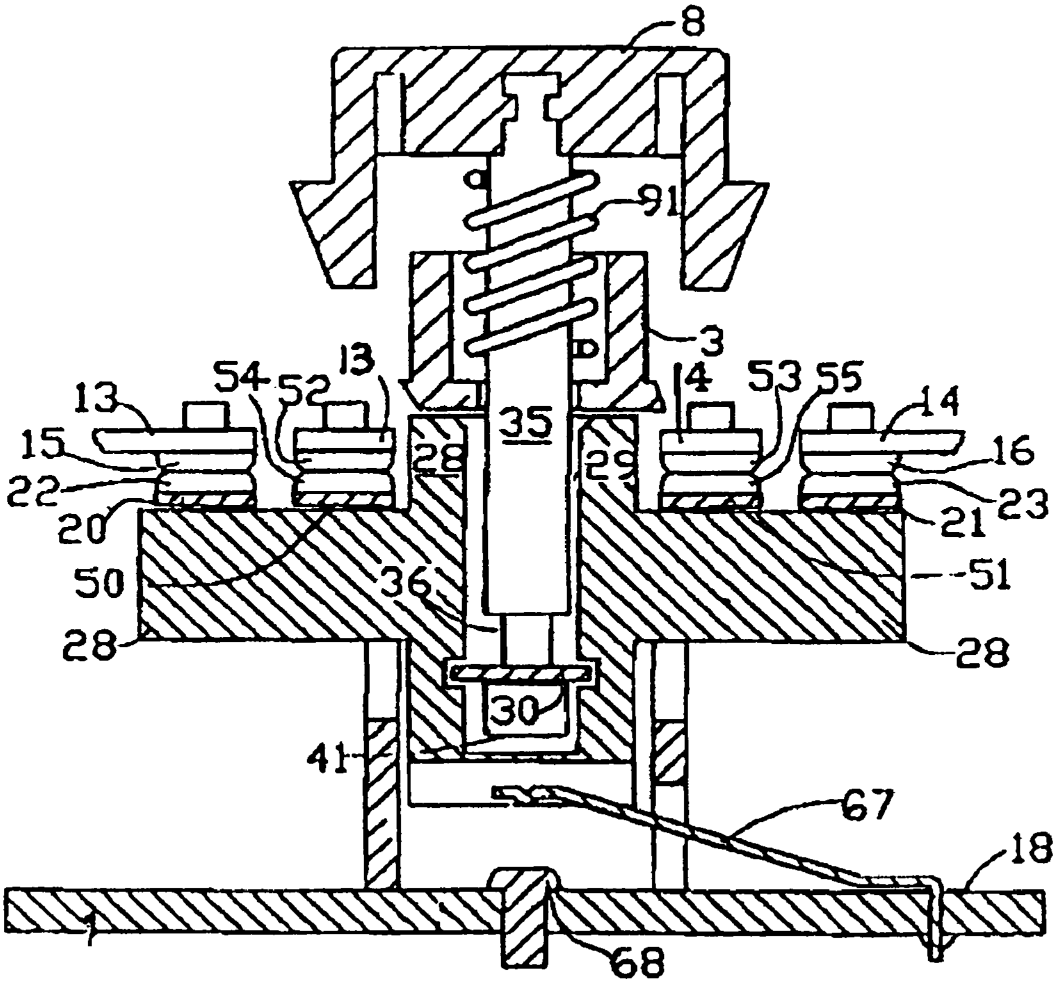
Figures 2B, 5:
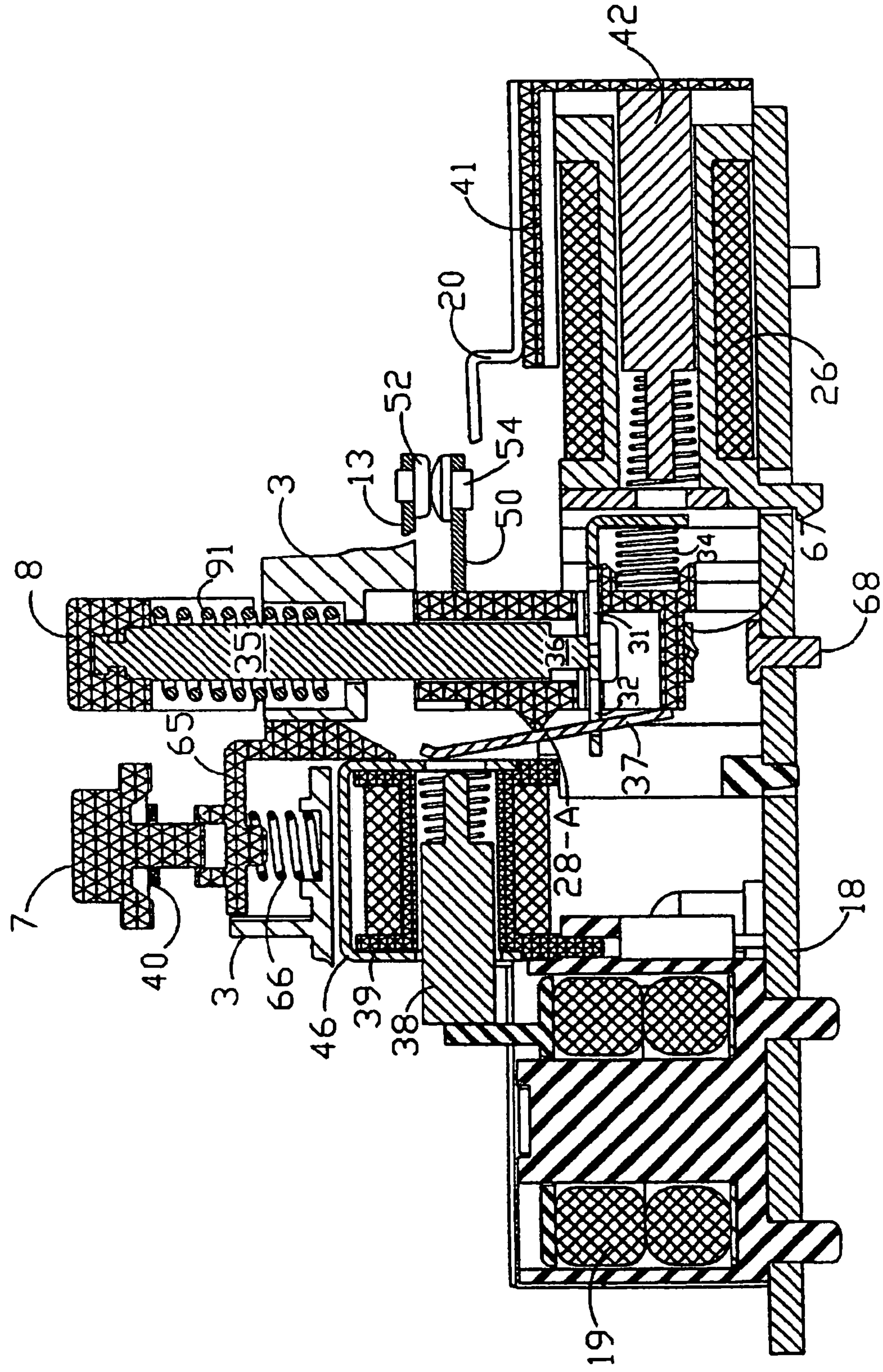
Figures 3A, 5:
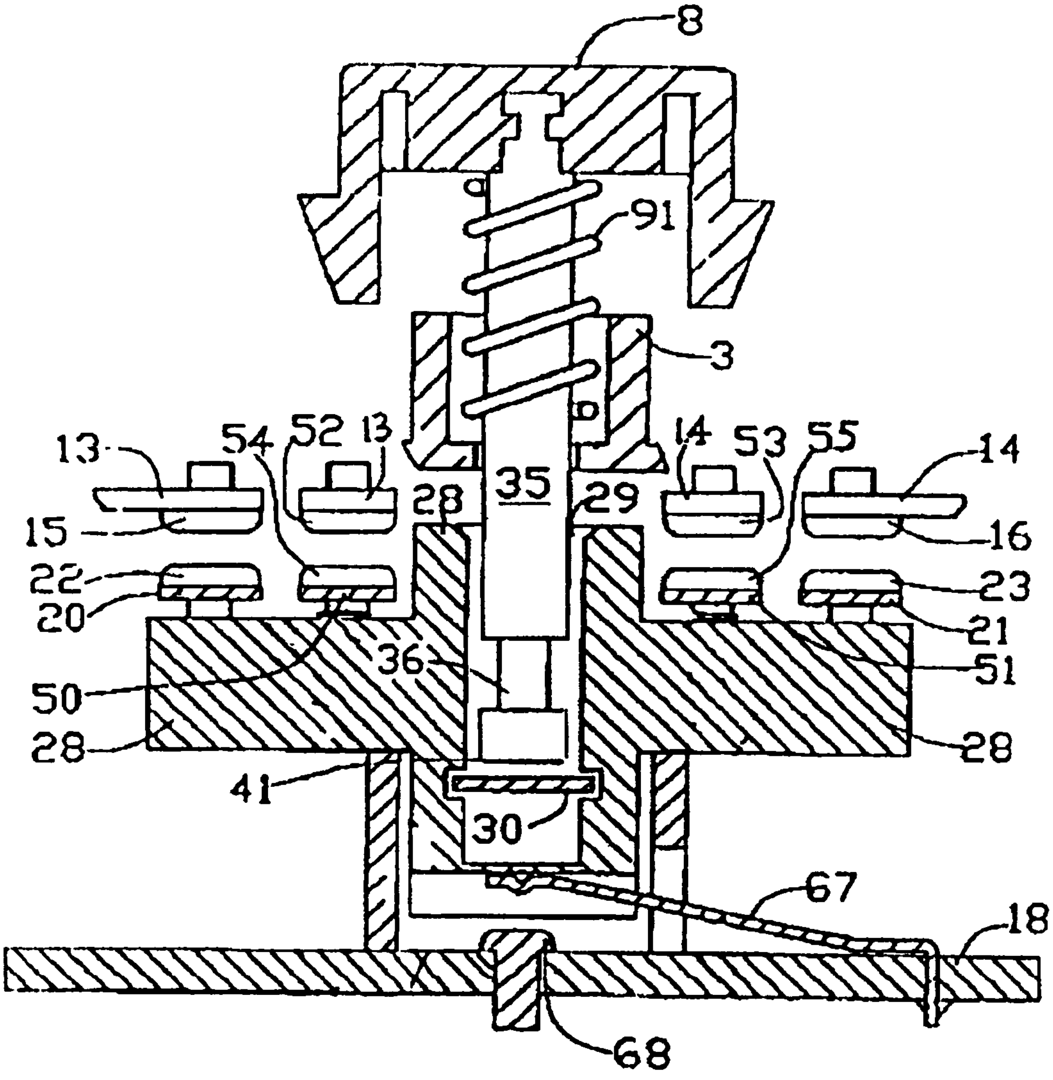
Figures 3B, 5:
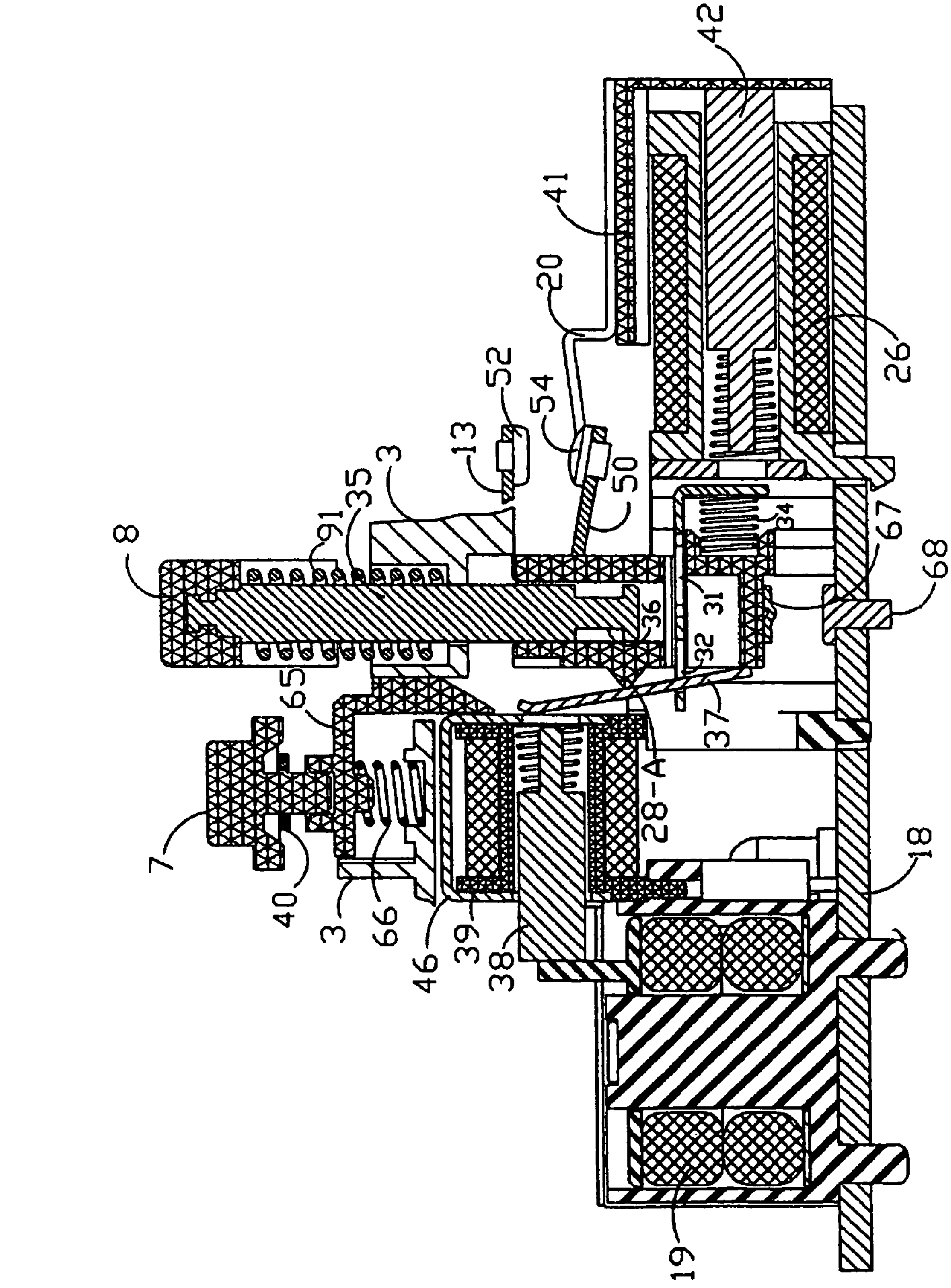
Figures 4, 5:
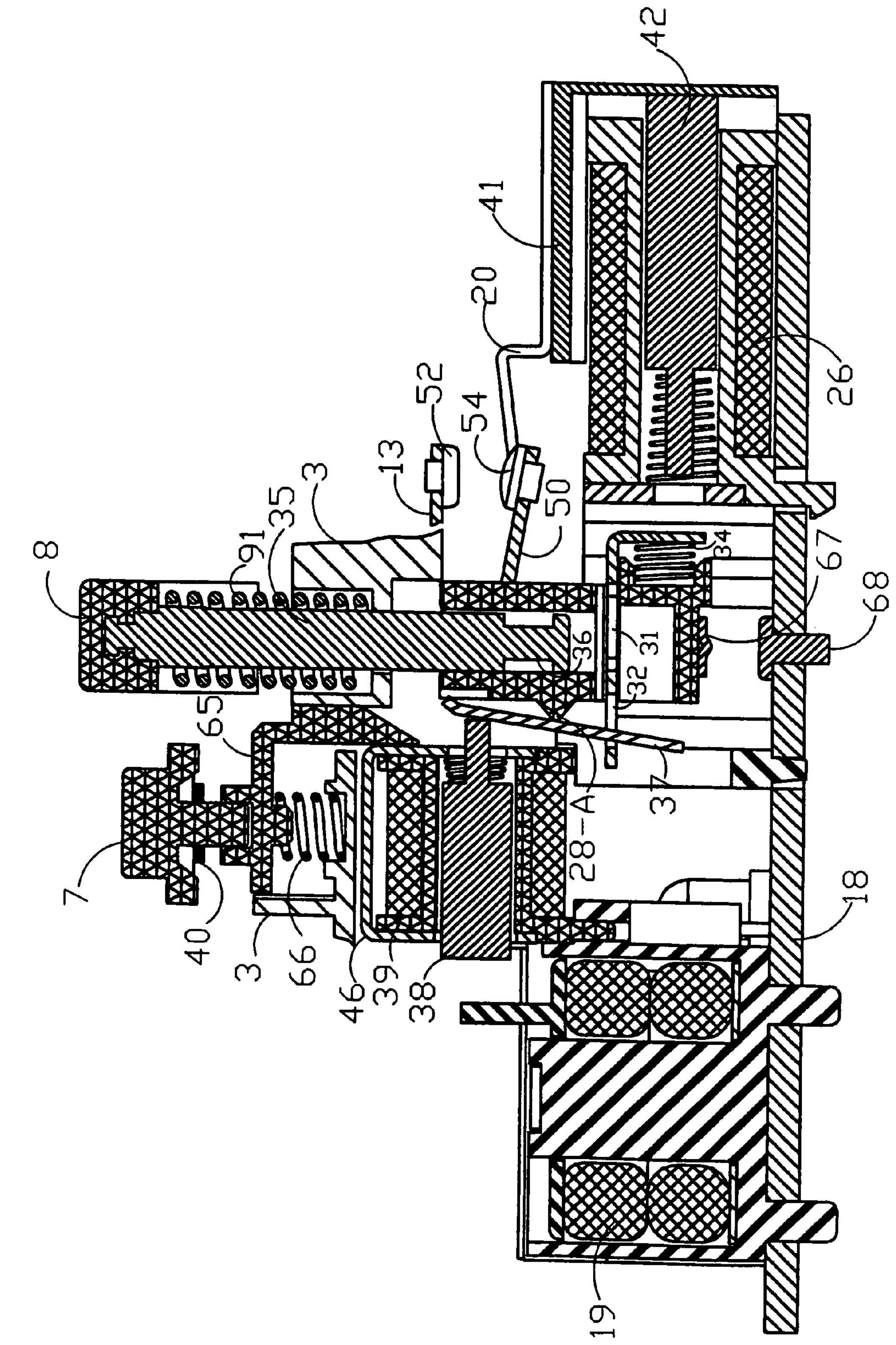
Figure 5:
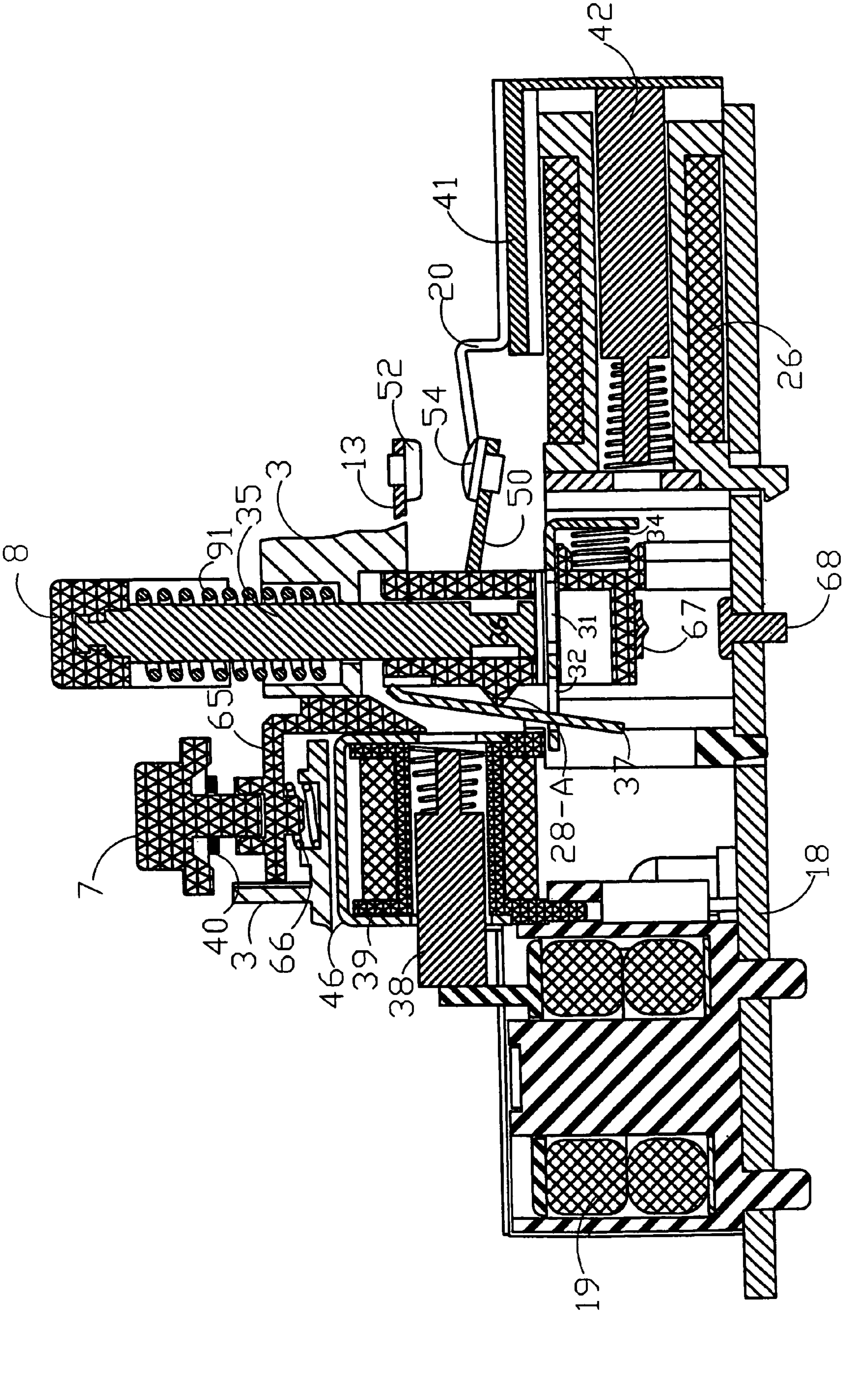

As shown in FIG. 5-1A and FIG. 5-1B, between the bottom of release 28 and circuit board 18, there are flexible unlocking switches 67 and 68 made of a flexible metal material. As shown in FIG. 8, one end 67 of this unlocking switch is connected to the positive pole of the direct current output by the rectification circuit on the circuit board; the other end 68 is fastened onto circuit board 18 and is connected to silicon controlled control pole SCR1 that controls whether primary electromagnetic coil 26 is energized and generates a magnetic field through the circuit board. When reset button 8 is pressed, reset guide column 35 and release 28 are moved downward therewith, thus closing two contacts 67 and 68 on the unlocking switch. Silicon controlled control pole SCR1 is energized, silicon controlled SCR1 is on, an electric current passes through primary electromagnetic coil 26 and generates a magnetic field, thus attracting iron core 42 to collide with fastener part 30 and moving it. The bottom of reset guide column 35 threads through central perforation 31 of fastener part 30; due to the inertia of flexible unlocking switches 67 and 68, the unlocking switch bounces up. The two ends 67 and 68 of the unlocking switch are disconnected. Silicon controlled control pole SCR1 has no voltage, and silicon controlled SCR1 is not on. No electric current passes through coil 26, and the magnetic field disappears; fastener spring 34 between fastener part 30 and release 28 moves fastener part 30 back and forth, thus causing central perforation 31 on fastener part 30 to slide into guide groove 36. Also, due to the release of spring 91 on top of reset guide column 35, release 28 is moved upward together with it, so that flexible metal sheets 50, 51, 20 and 21 on the lifting arms on both sides of release 28 move up together with it, and causing moving contacts 53 and 55 on flexible power input metal sheets 50 and 51 to come into contact with fixed contacts 52 and 53 on power output conductors 13 and 14, and power output conductors 13 and 14 are energized. Also, moving contacts 22 and 23 on flexible metal sheets 20 and 21 come into contact with fixed contacts 15 and 16 on power output conductors 13 and 14, thus causing flexible metal sheets 20 and 21 that are in contact with power output ends 80 and 81 to be energized. As shown in FIG. 5-2A and FIG. 5-2B, electric connection between power input and power output is achieved, and the ground fault circuit interrupter has power output.

When an installer erroneously connects the live power line and null power line with the power output ends 110 and 109 of the ground fault circuit interrupter, as shown in FIG. 8, control chips IC1 and IC2 on circuit board 18 have no working power supply and do not work. Control chip IC2 cannot output a control signal. Silicon control SCR1 is not on. No electric current passes through electromagnetic coil 26. No magnetic field is generated. Release 28 does not act. Power input ends 10, 9 of the interrupter have no power output at all. Therefore, this invention has the function of preventing any wiring error.

To achieve the purpose of being able to give off alarm prompt signals when the ground fault circuit interrupter comes to the end of its life or when a part or accessory fails and is not protective, as shown in FIG. 1 and FIG. 6, two alarm indicator lights G and R are welded on circuit board of this invention. To enable the light emitted by red indicator light R and green indicator light G to be emitted from status indicator light hole 30-A on upper cover 2, as shown in FIG. 6, this invention places light guide tube LED1 above indicator lights R and G, used to guide the light output of red and green indicator lights R and G, and embeds LED1 inside status indicator light hole 30-A.

As shown in FIG. 8, red indicator light R and resistances Rj1, Rj2, switches Kj1 and Kj2 are serially connected to form an alarm display circuit. Switches Kj1 and Kj2 are respectively located below power input metal sheets 50 and 51 and come into contact with power input metal sheets 50 and 51 when power input metal sheets 50 and 51 are at their initial locations. One end of green indicator light G is connected to display output end 1 of control chip IC2 used to detect whether the electric components inside the ground fault circuit interrupter work normally and to control actions of the electric components, and the other end of green indicator light G is connected to the positive pole of the diode rectification bridge.

After the ground fault circuit interrupter is connected to the power supply circuit, i.e., after wiring screws 10 and 9 at the input end of this invention are connected to the live power line and null power line at the power input end, when reset button is not pressed, power input metal sheets 50 and 51 are at their initial locations and come into contact with switches Kj1 and Kj2 located below power input metal sheets 50 and 51. An electric current passes through red indicator light R, and red indicator light R emits light; at the same time, control chip IC2 detects the electric components inside the ground fault circuit interrupter. When they all work normally and have not failed, the normal status display signal output of control chip IC2 outputs a low level, and green indicator light G emits light. Since both red indicator light R and green indicator light G emit light and guide red light and green light from the same light guide tube LED1, an orange light is seen. Therefore, when status indicator light hole 30-A on upper cover 2 emits an orange light, it indicates that this invention is in a standby state and is usable.

When reset button 8 is pressed, flexible power input metal sheets 50 and 51 leave their initial locations and move up. They are disconnected from witches Kj1 and Kj2. No electric current passes through red indicator light R used to send off an alarm, and it turns off; at the same time, since power input metal sheets 50 and 51 move up, moving contacts 54 and 55 thereon come into contact with fixed contacts 52 and 53 on power output conductors 13 and 14. Also, since moving contacts 22 and 23 on flexible metal sheets 20 and 21 also come into contact with fixed contacts 15 and 16 on power output conductors 13 and 14, power output conductors 13 and 14 and flexible metal sheets 20 and 21 are energized. Normal status display signal output end 1 of control chip IC2 outputs a low level. An electric current passes through green indicator light G, which emits a green light. Therefore, when the red light goes off and the green light emits light, it indicates that all is normal with the ground fault circuit interrupter, which can be used with peace of mind.

If there is a leak electric current in the power supply loop or when a part or accessory inside the ground fault circuit interrupter fails, the interrupter is inoperative or the interrupter has come to the end of its life, after control chip IC2 detects this condition, control signal output end 5 of control chip IC2 immediately outputs a signal, to cause the release to act and trip and cut off the power output of the interrupter. At the same time, display signal output end 1 of IC2 outputs a high level that causes green indicator light G to go out. Red indicator light R emits light that is reflected through light guide tube LED1 onto the surface of the interrupter, which also emits red light. Therefore, when status indicator light hole 30-A on upper cover 2 emits red light, it indicates that the line using electricity leaks electricity. The circuit should be checked first before being reset to connect electricity; repeatedly press reset button 8. If the red light still remains on, it indicates that a part or accessory inside the ground fault circuit interrupter fails, the interrupter is inoperative or the interrupter has come to the end of its life, and the user should promptly replace it with a new ground fault circuit interrupter.

Without the need to operate any button, control chip IC2 (model number WL20050201smbh) on control circuit board 18 of this invention can automatically detect whether the ground fault circuit interrupter has come to the end of its life at predetermined times and whether it still is capable of "detecting electricity leaks linked to earth and test control output." Its signal detect grounding electricity leak failures is sent out by pin 10 and pin 11 of control chip IC2, and is added to the magnetic loop of grounding leak electric current detection induction coils L1 and L2 through coil L3. As long as L1 and L2 have not become inoperative, the electric current signal that simulates a failure will surely be capable of sensing it and send this signal to the electric leak failure signal amplification and control chip IC1 through capacitors C1 and C3 (the input end of model number RV4145 or LM1851, to be compared inside IC1. When the electric current intensity of the simulated failure reaches the range specified by UL standards (4~6 mA), IC1 outputs a "release pulse signal"). This "release pulse signal" is fed to pin 6 of control chip IC2 within an extremely short mS grade timeframe. Thus, when control chip IC2 conforms that all functions for the ground fault circuit interrupter are normal, its pin 1 outputs a low level and causes green indicator light G to emit light, indicating that all is normal with the ground fault circuit interrupter; by contrast, pin 1 of control chip IC2 outputs a high level and causes green indicator light not to emit light and prohibits the release apparatus from acting and resetting. When confirming that all functions of the ground fault circuit interrupter are normal, and when control chip IC2 causes green indicator light to emit light, if a leaked electric current is detected on the power supply loop, i.e., chip IC1 detects the leaked electric current and outputs to pin 6 of control chip IC2. Pin 5 of the control chip outputs a control signal which causes silicon controlled SCR1 to turn on. Coil 26 is energized and causes the release apparatus to act and trip, thus cutting off the power supply of the interrupter. At the same time, pin 1 of IC2 becomes a high level and causes green light G to go out.

As shown in FIG. 1, FIG. 4 and FIG. 8, below test button 7, there is a flexible metal sheet 40 for testing. One end of flexible metal sheet 40 for testing is below test button 7, and the other end is connected to live power line output conductor 14. Below flexible metal sheet 40, there is an electric current leak test resistance 27. One end of electric current leak test resistance 27 is below flexible metal sheet 40 for testing, and the other end is welded onto the circuit board and is connected to null line WHITE on the power input end.

As shown in FIG. 8, when the user needs to cut off the power output of the interrupter, he may press test button 7, so that flexible metal sheet 40 for testing is connected to electric current leak test resistance 27, which simulates an electricity leak failure and generates an electric leak current. The electric leak current passes through live power line output metal sheet 14, flexible metal sheet 40 and electric current leak test resistance 27 to the null line at the power output end. After differential transformer 19 and chip IC1 detect this failure, control chip IC2 outputs a control signal immediately through control chip 2, so that silicon controlled SCR1 is on and an electric current passes through primary electromagnetic coil 26, which generates a magnetic field that causes iron core 42 inside to act and move fastener part 30. Reset guide column 35 jumps out of perforation 31 of fastener part 30, release 28 drops down and flexible power input metal sheets 50, 51, 20 and 21 drop down, disengaging their moving contacts from fixed contacts on power output conductors 13 and 14, thus further causing power output ends 80 and 81 connected to flexible metal sheets 20 and 21 not to be energized, either. The interrupter has no power output.

During the work process of a ground fault circuit interrupter, when there is a grounding error on a power supply line, this invention can cut off the power output of the ground fault circuit interrupter through the above structure. In addition, when the user wants to test whether ground fault circuit interrupter is intact or wants to cut off the power output of the interrupter, he may also press test button 7 and simulate a grounding failure by testing metal sheet 40 and testing resistance 27, so that primary electromagnetic coil 26 is energized and generates a magnetic field. Thus, the power output of the ground fault circuit interrupter is cut off through the above structure.

Since this invention controls actions of release 28 through controlling the energization or de-energization of primary electromagnetic coil 26 on the control circuit, thus controlling whether fixed contacts on flexible power input flexible metal sheets 50 and 51 come into contact with fixed assets on power output conductors 13 and 14 and controlling whether the interrupter has power output. Therefore, to prevent a failure of primary electromagnetic coil 26, which causes the ground fault circuit interrupter not to be able to work normally, as shown in FIG. 1, FIG. 4 and FIG. 5-4, this invention also installs a secondary electromagnetic coil 39 with a built-in iron core on circuit board 18 between release 28 and differential transformer 19. The end of iron core 38 built in secondary electromagnetic coil 39 directly faces the release lever 37. When primary electromagnetic coil 26 fails and cannot work normally, as shown in FIG. 5-4 and FIG. 8, pin 2 of control chip IC2 outputs a control signal, so that silicon controlled SCR1, which controls the energization of secondary electromagnetic coil 39, is on. Secondary electromagnetic coil 39 is energized and generates a magnetic field, which attracts iron core 38 inside secondary electromagnetic coil 39 and pushes release lever 37 to revolve around pivot 28-A, and which pulls fastener part 30 to move. Thus, the reset guide column 35 jumps out of fastener part 30. Release 28 drops down and flexible power input metal sheets 50 and 51 drop down, disengaging their moving contacts from fixed contacts on power output conductors 13 and 14. Metal power output conductors 13 and 14 are not energized, causing power output ends 80 and 81 connected to flexible metal sheets 20 and 21 not to be energized, either. The interrupter has no power output, thus cutting off power output of the interrupter.

To prevent the occurrence of any failure of the control circuit as shown in FIG. 8 or to prevent the inability to cut off power output from the interrupter during a failure of primary and secondary electromagnetic coils 26 and 39, as shown in FIG. 1, FIG. 5-2B and FIG. 5-5, this invention has also added a sliding sheet shaped like an inverted letter "L" between metal grounding support 1 and mid-level 3, under test button 7. The lower end of sliding sheet 65 is pointed, and its lower end threads through mid-level support 3 to come into contact with the upper end of release lever 37. A spring 66 is placed between sliding sheet 65 and mid-level support 3. When the control circuit of the interrupter fails or both the primary and secondary electromagnetic coils fail, making it impossible to cut off the power output of the interrupter, one may forcibly press down hard on test button 7, so that sliding sheet 65 under test button 7 moves downward and pushes release lever 37 to pull fastener part 30, 50 that fastener part 30 moves and causes reset guide column 35 to jump out of fastener part 30. Release 28 drops down, two pairs of flexible power input metal sheets, 50, 51, 20 and 21, drop down, disengaging their moving contacts from fixed contacts 13 and 14 on power output conductors 13 and 14, thus causing flexible power output conductors 13 and 14 and power output ends 80 and 81 not to be energized. Neither power output conductors 13 and 14 nor power output ends 80 and 81 not to be energized and cutting off power output to the interrupter.

As shown in FIG. 4, this invention has placed two pairs of spacing shims 43 and 44 as well as 73 and 74 below the moving contacts of flexible power input metal sheets 50 and 51 of the flexible power input, on the coil mount of primary electromagnetic coil 26.

The principles for this invention to achieve protection against leak electricity and control whether there is power connection between the power input end and power output end of the ground fault circuit interrupter are:

As shown in FIG. 5-1A and FIG. 5-1B, when this invention is intact and works normally, press reset button 8, so that reset guide column 35 connected to it moves downward and brings release 28 to move down, causing contacts 67 and 68 of the flexible unlocking switch to come into contact thus attracting iron core 42 to collide with fastener part 30 and moving it. The bottom of reset guide column 35 threads through central perforation 31 of fastener part 30; due to the inertia of flexible unlocking switches 67 and 68, the unlocking switch bounces up. The two ends 67 and 68 of the unlocking switch are disconnected. No electric current passes through coil 26, and the magnetic field disappears; fastener spring 34 between fastener part 30 and release 28 moves fastener part 30 back and forth, thus causing central perforation 31 on fastener part 30 to slide into guide groove 36. Also, due to the release of spring 91 on top of reset guide column 35, release 28 is moved upward together with it, so that flexible metal sheets 50, 51, 20 and 21 on the lifting arms on both sides of release 28 move up together with it, and causing moving contacts 53 and 55 on flexible power input metal sheets 50 and 51 to come into contact with fixed contacts 52 and 53 on power output conductors 13 and 14, and power output conductors 13 and 14 are energized. Also, moving contacts 22 and 23 on flexible metal sheets 20 and 21 come into contact with fixed contacts 15 and 16 on power output conductors 13 and 14, thus causing flexible metal sheets 20 and 21 that are in contact with power output ends 80 and 81 to be energized. As shown in FIG. 5-2A and FIG. 5-2B, electric connection between power input and power output is achieved, and power plug holes 5 and 6 and power output wiring screws 109 and 110 of the ground fault circuit interrupter have concurrent power output.

As shown in FIG. 8, when the ground fault circuit interrupter is intact, after it is connected to the power supply circuit, press reset button 8, green indicator light G begins to emit light. Red indicator light R used for sending out an alarm goes out, indicating that the ground fault circuit interrupter works normally and has power output. When the ground fault circuit interrupter has come to the end of its life and is inoperative, no matter how reset button is pressed, the ground fault circuit interrupter will not be reset and there is no power output. Red indicator light R always remains on and green indicator light G is not on. Therefore. Once green indicator light G is on, it indicates that the ground fault circuit interrupter is good and can be used with peace of mind. Once red indicator light R is always on even when reset button 8 is repeatedly pressed, it indicates that the interrupter has a problem and needs to be replaced.

When output of the ground fault circuit interrupter needs to be cut off, as indicated in FIG. 53A and FIG. 53B, one only needs to press down on test button 7, so that spring 40 for testing under test button 7 is connected to electric leak resistance 27, which simulates a grounding failure by generating an electric leak current. After differential transformer 19 and chip IC1 detect this failure, they output a control signal immediately through control chip IC2, so that silicon controlled SCR1 is on and an electric current passes through primary electromagnetic coil 26, which generates a magnetic field that causes iron core 42 inside to act and move fastener part 30. Reset guide column 35 jumps out of perforation 31 of fastener part 30, release 28 drops down and flexible power input metal sheets 50, 51, 20 and 21 drop down concurrently, disengaging moving contacts on flexible power input conductors 50 and 51 and metal sheets 20 and 21 from fixed contacts on power output conductors 13 and 14, thus further causing power output ends 80 and 81 and power output conductors 13 and 14 not to be energized. Neither power plug holes 5 and 6 nor power output wiring screws 109 and 110 of the ground fault circuit interrupter have power output, thus cutting off the power output of the interrupter.

When primary electromagnetic coils 26 fails and cannot work normally, as shown in FIG. 1 and FIGS. 5-4, this invention may also energize secondary electromagnetic coils 39, thus generating a magnetic field to attract iron core 38 in secondary electromagnetic coils 39, causing iron core 38 to push the release lever 37 to revolve around pivot point 28-A, pulling fastener part 30 and move it. Thus, reset guide column 35 is caused to jump out of fastener part 30. Release 28 drops down, flexible power input metal sheets, 50, 51, 20 and 21, drop down concurrently, disengaging their moving contacts from fixed contacts on power output conductors 13 and 14, thus causing flexible metal sheets 20 and 21 connected to power output ends 80 and 81 and flexible power output conductors 13 and 14 not to be energized. Neither power output conductors 13 and 14 nor power output ends 80 and 81 of the ground fault circuit interrupter have power output, cutting off power output to the interrupter.

When the control circuit fails or when primary and secondary electromagnetic coils 26 and 39 fail, making it impossible to cut off the power output of the interrupter, as shown in FIG. 1 and FIG. 5-5, one may also press down hard on test button 7, so that sliding sheet 65 under test button 7 moves downward and pushes release lever 37 to revolve around pivot point 28-A, thus pulling fastener part 30 and forcibly causing fastener 30 to move, which causes reset guide column 35 to jump out of fastener part 30. Release 28 drops down, two pairs of flexible power input metal sheets, 50, 51, 20 and 21, drop down, disengaging their moving contacts from fixed contacts on power output conductors 13 and 14, thus causing flexible metal sheets 20 and 21 connected to power output metal sheets 80 and 81 and flexible power output conductors 13 and 14 not to be energized. Neither power plug holes 5 and 6 nor power output wiring screws 109 and 110 of the ground fault circuit interrupter have power output, cutting off power output to the interrupter.

In addition, this invention may serially connect a speaker in the alarm prompt circuit. It generates a sound concurrent with a light display, achieving an alarm by both sound and light and reminder the user to pay attention.

Based on the above description, this invention not only provides protection against any leak electric current, but also is capable of preventing reverse wiring errors. Moreover, when the ground fault circuit interrupter has come to the end of its life and its functions fail, an alarm signal may be sent off, reminding the user to pay attention and to replace the ground fault circuit interrupter. When release solution 1, that is, release through the primary electromagnetic coil cannot be achieved, this invention may also implement release solution 2, that is, release through the secondary electromagnetic coil and cutting off power supply to the interrupter. This invention has powerful functions, with good safety and is safe to use, thus effectively ensuring the personal safety of the user as well as the safety of the appliances.

The invention claimed is:

1. A circuit interrupting device comprising:

a housing;

a pair of power input conductors, wherein each of said pair of power input conductors comprises a flexible power input metal sheet having a movable contact;

a pair of power output conductors, wherein each of said power output conductors comprises a pair of fixed contacts;

a pair of power output ends, wherein each of said power output ends comprises a flexible power output metal sheet having a movable contact;

a release apparatus capable of tripping said circuit interrupting device to cause electrical discontinuity between said pair of power input conductors, said pair of power output conductors, and said pair of power output ends when a fault occurs;

a primary electromagnetic coil capable of being energized and de-energized so as to control said release apparatus; and a secondary electromagnetic coil capable of controlling said release apparatus when said primary electromagnetic coil fails;

wherein when said primary electromagnetic coil fails, said secondary electromagnetic coil is turned on to allow said electric current to pass through said secondary electromagnetic coil to trip said release apparatus.

2. The circuit interrupting device according to claim 1, wherein said flexible power input metal sheet is coupled to a circuit board of said housing; wherein each of said pair of power output conductors is located at a side of a mid-level support of said housing; and wherein said flexible power output metal sheet is located at a side within a base of said housing.

3. The circuit interrupting device according to claim 1, wherein said release apparatus further comprises a release, a fastener part, a fastener spring, and a release lever.

4. The circuit interrupting device according to claim 3, wherein said movable contact on said flexible power input metal sheet and said movable contact on said flexible output metal sheet are crisscrossed with each other at a position above a side lifting arm of said release.

5. The circuit interrupting device according to claim 3, wherein said release is a rectangular columnar body located below a reset button; wherein said release apparatus further comprises a vertical, central through hole located on top of said release; wherein a left side and a right side of said release extend outward to form a pair of lifting arms; and wherein said pair of flexible power input metal sheets, and said pair of flexible output metal sheets are located above said pair of lifting arms on both sides of said release.

6. The circuit interrupting device according to claim 3, wherein said release apparatus further comprises:

a slot located between a side wall of said release and a side wall of said fastener part, wherein said fastener spring is located inside the circular slot; and a hole located at one end of a top of said fastener part, wherein said release lever is located inside said hole and capable of revolving on a pivot point on said side wall of said release;

wherein said release, said fastener part, said fastener spring, and said release lever jointly form a unit that can move freely.

7. The circuit interrupting device according to claim 3, wherein said secondary electromagnetic coil is located between said release and a differential transformer, wherein said secondary electromagnetic coil includes a built-in iron core.

8. The circuit interrupting device according to claim 1, wherein said flexible power input metal sheet, a differential transformer, said release apparatus, and said primary electromagnetic coil are located on a circuit board.

9. The circuit interrupting device according to claim 1, further comprising:

a pair of gripping wing pieces respectively located on each end of each of said pair of power output conductors, wherein each of said pair of gripping wing pieces, respectively, passes through a power output plug hole of an upper cover of said circuit interrupting device.

10. The circuit interrupting device according to claim 9, wherein a fastener part located below and threading through a release is removable; and wherein said release further comprises a through hole located on top of said fastener part which corresponds to a through hole of said release.

11. The circuit interrupting device according to claim 1, further comprising:

a first alarm indicator light and a second alarm indicator light capable of sending alarm signals; and a first control integrated circuit chip capable of detecting whether electric components inside said circuit interrupting device are working normally, wherein when input ends of said circuit interrupting device are properly wired, said first alarm indicator light is turned on, and wherein when said circuit interrupting device are not properly wired, said first alarm indictor light is turned off; and wherein when said electric components inside said circuit interrupting device work normally, a second control integrated circuit chip outputs a first control signal, causing said second alarm indicator light to be turned on, and wherein when said electric components inside said circuit interrupting device do not work normally, said second control integrated circuit chip outputs a second control signal, causing said second alarm indicator light to be turned off.

12. A method for preventing wiring errors in said a circuit interrupting device according to claim 1 comprising:

powering said circuit interrupting device, wherein when said circuit interrupting device is powered properly, said primary electromagnetic coil is energized to allow reset of said circuit interrupting device and provide power output to said pair of power output conductors and said pair of power output ends;

wherein when said circuit interrupting device is not powered properly, said primary electromagnetic coil is not energized, so that no power output is provided to said pair of power output conductors and said pair of power output ends; and wherein when said circuit interrupting device is wired properly but said primary electromagnetic coil fails, said secondary electromagnetic coil is automatically turned on to allow reset of said circuit interrupting device and provide power output to said pair of power output conductors and said pair of power output ends.

13. The circuit interrupting device of claim 1, wherein said primary electromagnetic coil and said secondary electromagnetic coil are controlled by separate silicon controlled rectifiers.

14. The circuit interrupting device of claim 1, wherein said pair of said fixed contacts on each of said power output conductors are different in size and shape.

15. The circuit interrupting device of claim 1, further comprising a flexible unlocking switch comprising a pair of spring pieces, wherein one end of said flexible unlocking switch is connected to a primary silicon controlled rectifier (SCR1), whereby when said circuit interrupting device is wired properly, a contact of said pair of spring pieces provides an electric current to turn on said primary silicon controlled rectifier, which in turn allows said electrical current to pass through said primary electromagnetic coil so as to trip said release apparatus; and whereby when said circuit interrupting device is not wired properly, a contact of said pair of spring pieces does not provide an electric current to turn on said primary silicon controlled rectifier, so that no electric current passes through said primary electromagnetic coil to trip said release apparatus.

16. The circuit interrupting device of claim 1, wherein said movable contact on said flexible power input metal sheet is capable of electrically connecting to or disconnecting from one of said pair of fixed contacts on each of said power output conductors; and wherein said movable contact on said flexible power output metal sheet is capable of electrically connecting to or disconnecting from the other of said pair of fixed contacts on each of said power output conductors.

* * * * *